United States Patent [19]
Gross et al.

[11] 3,975,183
[45] Aug. 17, 1976

[54] USE OF ALKALI METAL SILICATES TO REDUCE PARTICULATE EMISSIONS IN SINTERING OPERATIONS

[75] Inventors: Anthony E. Gross, Darien; Larry J. Connelly, Oak Lawn, both of Ill.

[73] Assignee: Nalco Chemical Company, Oak Brook, Ill.

[22] Filed: Mar. 20, 1975

[21] Appl. No.: 560,065

[52] U.S. Cl. ............................................. 75/3; 75/25
[51] Int. Cl.² ..................... C22B 1/08; C21B 3/04
[58] Field of Search .................................. 75/3–5, 75/25

[56] References Cited
UNITED STATES PATENTS

| | | | |
|---|---|---|---|
| 1,847,596 | 3/1932 | Cavers | 75/5 |
| 2,450,343 | 9/1948 | Howard | 75/5 |
| 2,771,355 | 11/1956 | Cohen | 75/3 |
| 2,865,731 | 12/1958 | Crowe | 75/3 |
| 3,309,196 | 3/1967 | Kaneko | 75/3 |
| 3,816,095 | 6/1974 | Bruen | 75/3 |
| 3,852,059 | 12/1974 | Bruen | 75/3 |

Primary Examiner—P. D. Rosenberg
Attorney, Agent, or Firm—John G. Premo; Robert A. Miller; Barry W. Sufrin

[57] ABSTRACT

Particulate matter common to sintering operations can be substantially reduced by the addition to the sinter mix prior to fusion of an alkali metal or ammonium silicate.

5 Claims, No Drawings

USE OF ALKALI METAL SILICATES TO REDUCE PARTICULATE EMISSIONS IN SINTERING OPERATIONS

INTRODUCTION

In sintering, a shallow bed of fine particles is agglomerated by heat exchange and partial fusion of the quiescent mass. Heat is generated by combustion of a solid fuel admixed with the bed of iron bearing fines being agglomerated. The combustion is initiated by igniting the fuel exposed at the surface of the bed, after which a narrow, high temperature zone is caused to move through the bed by an induced draft, usually applied at the bottom of the bed. Within this narrow zone, the surfaces of adjacent particles reach fusion temperature, and gangue constituents form a semi-liquid slag. The bonding is effected by a combination of fusion, grain growth and slag liquidation. The generation of volatiles from the fuel and fluxstone creates a frothy condition and the incoming air quenches and solidifies the rear edge of the advancing fusion zone. The product consists of a cellular mass of ore bonded in a slag matrix.

In the ferrous industry, the essential materials for sintering consist of a mixture of iron-bearing fines and a solid, particulated fuel. The iron-bearing constituents are principally iron ore fines, recycled sinter fines, and flue dust, but may also include mill scale, open hearth precipitator dust, dust from basic oxygen steel production (BOP) and similar iron-bearing materials. Coke breeze is the most common solid fuel, but other carbonaceous materials can be used. When sintering a high sulfur material, such as a pyrite, the oxidation of the sulfur may satisfy completely the fuel requirements. It has also become common practice to incorporate limestone fines into the sinter mix, and this material may now be considered as a usual constituent in a typical sinter mix. This composite of fine material is well mixed and placed on the sinter strand in a shallow bed, seldom less than 6 inches or more than 20 inches in depth. Upon ignition, within a furnace which straddles the bed, the surface of the bed is heated to about 2300° to 2500°F, combustion of the fuel is initiated, and the fine particles at the surface are fused together. As air is drawn through the bed, the high temperature zone of combustion and fusion moves downwardly through the bed and produces a bonded, cellular structure.

During the process, the induced air is preheated by the hot sinter overlying the combustion and fusion zone, and the sensible heat contained in the combustion products and in the excess air is transferred to the bed below the fusion zone.

The detailed design and physical placement of sintering equipment and the flow pattern of materials may differ considerably among various plants. The choice of equipment is generally based on desired capacity, space availability, capital costs, the materials to be handled, and prevailing technology. Each plant can, however, be subdivided into three distinct phases of operation. These are (1) raw materials processing, (2) sinter production, and (3) product processing.

In the raw materials processing operation, the inbound iron-bearing fines are first screened, or crushed and screened, at the maximum size desired for the furnace coarse ore, generally 2 to 3 inches. The undersize ore is then rescreened at ⅜ to ½ inch, the oversize sent directly to the furnace as coarse ore, and the undersize conveyed to storage bins. A separate raw materials system handles the balance of the materials, such as flue dust, limestone, coke breeze, mill scale, etc. Except for the coke breeze, these materials are sufficiently fine for sintering and are conveyed directly to the storage bins. The coke breeze is ground prior to storage. From the raw materials storage bins, the desired materials are fed at controlled and specified rates onto a common collector belt, and thence to a mill or other mixing device such as a balling drum or disc. These devices used singularly or in combination promote both mixing and balling. Moisture for proper conditioning of the mix is added during the mixing and conditioning. The mixed and micropelletized feed is transferred to the sinter strand.

The production of the sinter per se occurs entirely on the sinter strand. Prior to feeding the raw mix, a grate layer of cold intermediate size sinter, usually ¾ inch by ¼ inch, is fed onto the machine usually to a depth of 1 to 2 inches. This is done to reduce the temperature to which the grate bars are exposed; lower temperatures extend grate bar life. This layer also suffices to reduce the amount of fine material reaching and passing through the grate bars. The raw mix is fed directly onto the grate layer to a predetermined bed depth usually 12–16 inches, ignited by a furnace fired with a liquid or gaseous fuel, and the process initiated. The speed of the machine (sinter strand) is regulated such that the high temperature zone of fusion reaches the grate layer as the material reaches the discharge end of the machine.

After ignition, suction fans pull air through the sinter bed into windboxes located between the upper and lower reaches of the sinter strand and then into one or more collection mains essentially causing the forced air ignition and fusion of the sinter mix. Dust cleaning of the exhaust gas is done in cyclone separators or precipitators. In some instances, a combination of these two types of equipment is used and placed between the collector mains and the fans.

Product processing begins at the discharge from the strand where the porous coherent lumps pass through a breaker. The large cake is reduced to a maximum size of 8 to 12 inches to facilitate cooling. The fines generated from this crushing operation are removed by a screen and recycled to the raw mix feed. The oversize is conveyed to sinter cooler. These are usually devices for passing air through the sinter, all of which function to reduce the temperature of the sinter such that it may be subsequently handled without damage to the conveying equipment. From the cooler, the sinter is cold screened, usually into three size consists. The smallest size consist, usually minus ¼ inch, is recycled as cold return fines. An intermediate size, usually ¾ inch by ¼ inch, is either recycled as grate layer or sent to product storage depending on the needs for grate layer material. The coarsest size is sent directly to product storage.

A serious problem which has long been associated with sinter production has been the fact that while dust cleaning of exhaust gas is usually done in vacuum separators, cyclones or electrostatic precipitators in some instances these means are unable to remove all of the fine particulate matter from the tremendous volume of gases exhausted during the ignition, blowing and cooling stages with the result being that very serious air pollution problems have become associated with the process. It would, therefore, be an advantage to the art if a method could be found for the prevention of dusting and fines during the sintering operation. This method would provide an economical method of substantially reducing particulate emissions from sintering operations and would help to speed up sintering operations due to the fact that less dust collected by conventional techniques would have to be fed back and thus recycled.

We have now found that by adding to the iron bearing fines prior to ignition an aqueous solution of an alkali metal or ammonium silicate these particulate emissions can be greatly eliminated.

OBJECTS

It is, therefore, an object of our invention to provide to the art a method for the reduction of particulate matter from sintering processes.

A further object of our invention is to provide to the art a method for the reduction of particulate emission from sintering plants which comprises spraying onto the ironing bearing fines and solid fuel an aqueous solution of an alkali metal or ammonium silicate.

A still further object of our invention is to substantially reduce particulate emissions from both cooling and heating operations in a sintering plant by spraying onto the iron bearing fines prior to ignition an aqueous solution of an alkali metal or ammonium silicate.

Other objects will appear hereinafter.

THE INVENTION

Dust problems from sintering plants are well known and with recent improved air quality standards will have to be very severely limited. To this point in time no known feasible technology has succeeded in eliminating the particulate emissions from this process and due to the increased importance of sinter and the recovery of iron fines for reuse, a method that would substantially reduce particulate emissions would be of great help. We have found that by spraying onto the iron bearing fines and other material an aqueous solution of an alkali metal or ammonium silicate prior to ignition substantial reductions in particulate matter emissions are realized using conventional sintering plant technology.

The alkali metal or ammonium silicates which are used in our invention typically have ratios of $SiO_2$ to ammonium or alkali metal calculated as $Na_2O$ of at least 1.0. Preferred alkali metal or ammonium silicates have a $SiO_2$ to alkali metal ratio expressed as $SiO_2:Na_2O$ of at least 2. Ratios as high as 5:1 may also be used. Typical compounds useful in the practice of the invention are sodium silicate, $Na_2O.X\ SiO_2$ where X equals 3 to 5; sodium disilicate, $Na_2Si_2O_5$; sodium metasilicate, $Na_2SiO_3$; sodium metasilicate monahydrate, $NaSiO_3.9H_2O$; sodium orthosilicate $Na_4SiO_4$; and potassium tetrasilicate, $K_2Si_4O_9.H_2O$. It is to be understood however that we do not want to be limited to only the above compounds but to those compounds which are alkali metal or ammonium salts of silicates and which are substantially soluble in a liquid which can be sprayed. It is within the scope of our invention to use other silicate containing compounds which are soluble in organic liquids. In our process it is also important to take into account the economics of the process as well as fire hazards and for this reason we prefer to use sodium silicate which is well known, commercially available and inexpensive. The alkali metals which may be used as the alkali metal portion of our silicates include all those of Group 1 and especially sodium, potassium, and lithium.

We do not completely understand how the interaction of the alkali metal or ammonium silicate works on the sinter. However, we believe that the silicate acts as a binding or agglomerating agent and attaches the fines to one another and/or to larger particles. In the agglomerated state, the fines are not drawn out of the furnace by the high air velocity, and discharge to the atmosphere is prevented. Also, by agglomerating the fines into larger particles the fines are prevented from filling voids in the bed and thus greater porosity is obtained which allows faster movement of the sinter bed with less wind box vacuum buildup. The alkali metal or ammonium silicates which we prefer to use will not be burnt off by the intense heat of the ignition operations and we believe that they may form a glass which acts as a permanent binder.

In the use of our alkali metal or ammonium silicates we prefer to spray these components onto the iron bearing fines or sinter mix as a very dilute solution which may vary between 0.1 up to about 10% by weight. We also prefer to spray the material on using a pressurized system which can typically give from 10 to 100 pounds per square inch of pressure so that we may achieve penetration of the alkali or ammonium silicate into the fines which are to be fused. In the spraying of the alkali metal or ammonium silicate onto the iron-bearing fines it should be noted that the amount of moisture present should be controlled, with the moisture level present being discovered through routine experimentation as to the quality of sinter produced with varying moisture contents. Thus, a more or less concentrated solution of our alkali metal or ammonium silicates can be used depending on the moisture content of the iron bearing fines as they enter the sintering process. In the application of our alkali metal or ammonium silicates we prefer to add at least 0.0025 pounds of the alkali metal or ammonium silicate per ton of iron bearing fines and other materials used to make up the mix of the material to be sintered. Preferably we prefer to add from 0.025 to 5 pounds of the alkali metal or ammonium silicate per ton. Most preferably we prefer to add from 0.01–1 pound of the alkali metal or ammonium silicate per ton of mix.

We have found that concentrations below this level do not provide enough binding ability although some activity in reducing particulates will be seen. As much sodium silicate as necessary can be added to the material before it is ignited since another of the advantages of our material is that it contains materials already common to the steel industry and thus will not provide contaminants since it will be recovered in the slag portion of iron or steel production.

We have also found in the course of our invention that in order to increase the penetration of the alkali metal or ammonium silicate into the sinter mix, it may be advantageous to admix with the alkali metal or ammonium silicate a quantity of a water soluble surfactant. These surfactants when employed in our invention are added at low levels to the concentrated alkali metal or ammonium silicate solution prior to spraying. Often, from 0.01–10% by weight of these surfactants may be added to the concentrated solution of the alkali metal or ammonium silicate prior to dilution and spraying. Preferably, from 0.1–3% by weight surfactant is added to the concentrated solution of the alkali metal silicate prior to dilution and spraying. The surfactants which we prefer to use are of well known types and will be familiar to those of ordinary skill in the art. Examples of suitable surfactants include alkyl phenols ethoxylated with from 1-20 moles per molecule of an alkylene oxide, such as nonylphenolexthoxylated with 9 moles of ethylene oxide. While the surfactants that we prefer to use are of the nonionic class, other surfactants, both cationic and anionic may perform satisfactory providing that they are water soluble, and remain soluble in the alkali metal or ammonium silicate solutions.

When using the surfactants, they should be added in a quantity sufficient to increase the penetration and wetting of the alkali metal or ammonium silicate into the sinter mix.

In order to better illustrate our invention, the following example is presented.

EXAMPLE

In this example, an aqueous solution of sodium silicate was sprayed onto the sinter burden (the iron bearing fines, coke breeze, etc., before ignition) as it was being distributed onto the hearth layer on the sinter strand. The sinter mix employed in this example consists of the following:

| | | |
|---|---|---|
| 1) Red Ore Fines | | 36% |
| 2) Canadian Ore Fines | | 14% |
| 3) Coke Breeze | | 8% |
| 4) Flux Fines | | 14% |
| 5) BOP Fines (Basic Oxygen Process) | | 7% |
| 6) Baghouse Fines | (Dust recovered from sintering operations) | 4% |
| 7) Recycled Sinter Fines | | 5% |
| 8) Recycled Sinter (Hearth Layer) | | 10% |

The function of the various components in the sinter mix were as follows:
1. Source of Iron
   a. Red Ore Fines
   b. Canadian Ore Fines
   c. BOP Fines
   d. Baghouse Fines
   e. Recycled Sinter Fines
2. Remove Impurities From the Iron and Transfer Them to Slag (Fluxing)
   a. Flux Fines
3. Provide Fuel For Sintering Mix After Initial Ignition
   a. Coke Breeze
   b. BOP Fines (Sometimes contain carbon)

A manifold with six spray nozzles was used to uniformly distribute the solution across the eight foot width of the sinter strand and the nozzles were directed so that the solution was fairly uniformly distributed throughout the depth of the burden. The sprayed solution was obtained by in-line dilution of a 29% $Na_2SiO_3$ solution which has a $SiO_2$-$Na_2$ ratio of 3.25/1. It was then piped to a spray nozzle and sprayed onto the fines at a pressure of 45 to 50 pounds per square inch. The rate of spraying the diluted solution was 3 gallons per minute, and that of the concentrated solution was 0.17 gallons per minute. With the speed of the strand, this gave a dosage of 0.2 pounds of alkali metal silicate per ton of sinter mix. Water which was added previous to this point to give the proper moisture for optimum burning was taken into account to compensate for the sprayed water and to keep the moisture level of the fines at a normal plant operating level. When the sodium silicate was sprayed in the above manner several improvements in the plant operation were observed:

A. A visual inspection of the stack showed a large reduction in the amount of "red dust" going out of the stack and into the atmosphere.
B. Bolometer readings taken inside the stack were lower, indicating less particulate matter going through the stack.
C. Less dust was collected by the cyclones which were the normal dust collection means employed by this plant to collect sinter dust prior to the stack, indicating less dust being admitted from the sinter operation.
D. Wind box vacuum was less and more constant then in runs without our chemical additive indicating greater bed porosity and less blinding of the bed.
E. Better ignition and flame penetration was noted on the bed with less surface flaring indicating greater porosity.
F. Better and more even burning rates were achieved with our chemical treatment.

Having thus described our invention we claim:

1. A method of reducing the amount of finely divided particulate discharged in a sintering process of the type wherein a sinter mix comprising a shallow bed of fine particles comprising iron-bearing ores and carbonaceous fuel is agglomerated by forced air-ignition and fusion so as to produce porous coherent lumps followed by breaking the porous lumps into useful sizes and then, cooling the resulting particles by air, the improvement comprising spraying onto the sinter mix prior to ignition and fusion an aqueous solution of an alkali metal silicate, said alkali metal silicate having a $SiO_2$:alkali metal ratio of at least two, expressed as $SiO_2$:$Na_2O$, in a quantity sufficient to provide at least 0.0025 pounds of alkali metal silicate per ton of sinter mix wherein particulate emissions form the forced air-ignition and fusion of the fine particles and from the air cooling of the porous coherent lumps are substantially reduced.

2. A method of reducing the amount of finely divided particulate matter discharged in a sintering process of the type wherein a sinter mix comprising a shallow bed of fine particles comprising iron-bearing ores and carbonaceous fuel is agglomerated by forced air-ignition and fusion so as to produce porous coherent lumps followed by breaking the porous lumps into useful sizes and then, cooling the resulting particles by air, the improvement comprising spraying onto the sinter mix prior to ignition and fusion an aqueous solution of an ammonium silicate in a quantity sufficient to provide at least .0025 pounds of ammonium silicate per ton of sinter mix wherein particulate emissions form the forced air-ignition and fusion of the fine particles and from the air cooling of the porous coherent lumps are substantially reduced.

3. The method of claim 2 wherein the ammonium silicate solution contains a nonionic surfactant in an amount sufficient to increase the penetration of the material on the sinter mix.

4. The method of claim 1 wherein the alkali metal silicate has an $SiO_2$ to $Na_2O$ ratio of at least 1 and the amount applied to the sinter mix ranges between 0.01–1.0 pound per ton.

5. The method of claim 1 where the alkali metal silicate solutions contains a nonionic surfactant in an amount sufficient to increase the penetration of the material on the sinter mix.

\* \* \* \* \*